US010118333B2

(12) United States Patent
Zhang et al.

(10) Patent No.: US 10,118,333 B2
(45) Date of Patent: Nov. 6, 2018

(54) FILM APPLICATION APPARATUS

(71) Applicants: SHENZHENSHI YUZHAN PRECISION TECHNOLOGY CO., LTD., Shenzhen (CN); CLOUD NETWORK TECHNOLOGY SINGAPORE PTE. LTD., Singapore (SG)

(72) Inventors: Xin-Jian Zhang, Shenzhen (CN); Kuo-An Hsieh, New Taipei (TW); Xian-Lin Yang, New Taipei (TW); Xin Hou, Shenzhen (CN); Ke-Feng Zhu, Shenzhen (CN)

(73) Assignees: SHENZHENSHI YUZHAN PRECISION TECHNOLOGY, Shenzhen (CN); Cloud Network Technology Singapore Pte. Ltd., Singapore (SG)

( * ) Notice: Subject to any disclaimer, the term of this patent is extended or adjusted under 35 U.S.C. 154(b) by 380 days.

(21) Appl. No.: 14/838,697

(22) Filed: Aug. 28, 2015

(65) Prior Publication Data
US 2016/0059531 A1 Mar. 3, 2016

(30) Foreign Application Priority Data

Sep. 1, 2014 (CN) .......................... 2014 1 0439544

(51) Int. Cl.
| | |
|---|---|
| *B29C 63/00* | (2006.01) |
| *B29C 63/02* | (2006.01) |
| *B29L 31/46* | (2006.01) |
| *B29L 31/34* | (2006.01) |
| *B65H 37/00* | (2006.01) |

(52) U.S. Cl.
CPC ....... *B29C 63/02* (2013.01); *B29L 2031/3437* (2013.01); *B29L 2031/3475* (2013.01); *B29L 2031/463* (2013.01); *B65H 37/007* (2013.01)

(58) Field of Classification Search
CPC ......... B41L 19/00; B65D 1/22; B65D 5/4245; B65D 5/4262; B65D 5/66; B65D 17/16; B65D 33/24; B65D 40/00; B65D 51/04; B54D 33/20; B29C 63/02; B65H 37/007; B29L 2031/46; B29L 2031/463
USPC .......................... 156/538, 574, 579; 101/269
See application file for complete search history.

(56) References Cited

U.S. PATENT DOCUMENTS

| | | | | |
|---|---|---|---|---|
| 3,705,548 A | * | 12/1972 | Waterman ............... | B41L 47/46 101/269 |
| 3,707,911 A | * | 1/1973 | Patterson, Jr. .......... | B41L 19/00 101/269 |
| 4,027,589 A | * | 6/1977 | Timm ..................... | B41L 19/00 101/269 |

FOREIGN PATENT DOCUMENTS

| | | |
|---|---|---|
| CN | 202557834 U | 11/2012 |
| CN | 102963557 A | 3/2013 |

* cited by examiner

*Primary Examiner* — Alex B Efta
(74) *Attorney, Agent, or Firm* — ScienBiziP, P.C.

(57) ABSTRACT

A film application apparatus includes a first base configured to couple a film material and a second base rotatably coupled to the first base. The first base defines an opening and two through holes on opposite side of the first base, the through holes communicate with the opening. The second base defines a receiving chamber and the receiving chamber is configured for accommodating a work piece. The film application apparatus further includes a pressing component inserted through the first base, the pressing component penetrating through the opening from the two through holes (Continued)

for pressing the film material against to a face of the work piece.

17 Claims, 5 Drawing Sheets

FILM APPLICATION APPARATUS

FIELD

The subject matter herein generally relates to film application apparatus.

BACKGROUND

Most electronic products have a display. A film material is usually attached to the displays to protect the display from screen bumps, scratches or dust. The display can be viewed through the film material. Traditionally the film material is manually positioned. But, repeated contact with the film material in the process of positioning the film material, allows the film material to be contaminated or scratched, and thus affecting the appearance quality of the display.

BRIEF DESCRIPTION OF THE DRAWINGS

Implementations of the present technology will now be described, by way of example only, with reference to the attached figures.

DETAILED DESCRIPTION OF EMBODIMENTS

Figure 1:
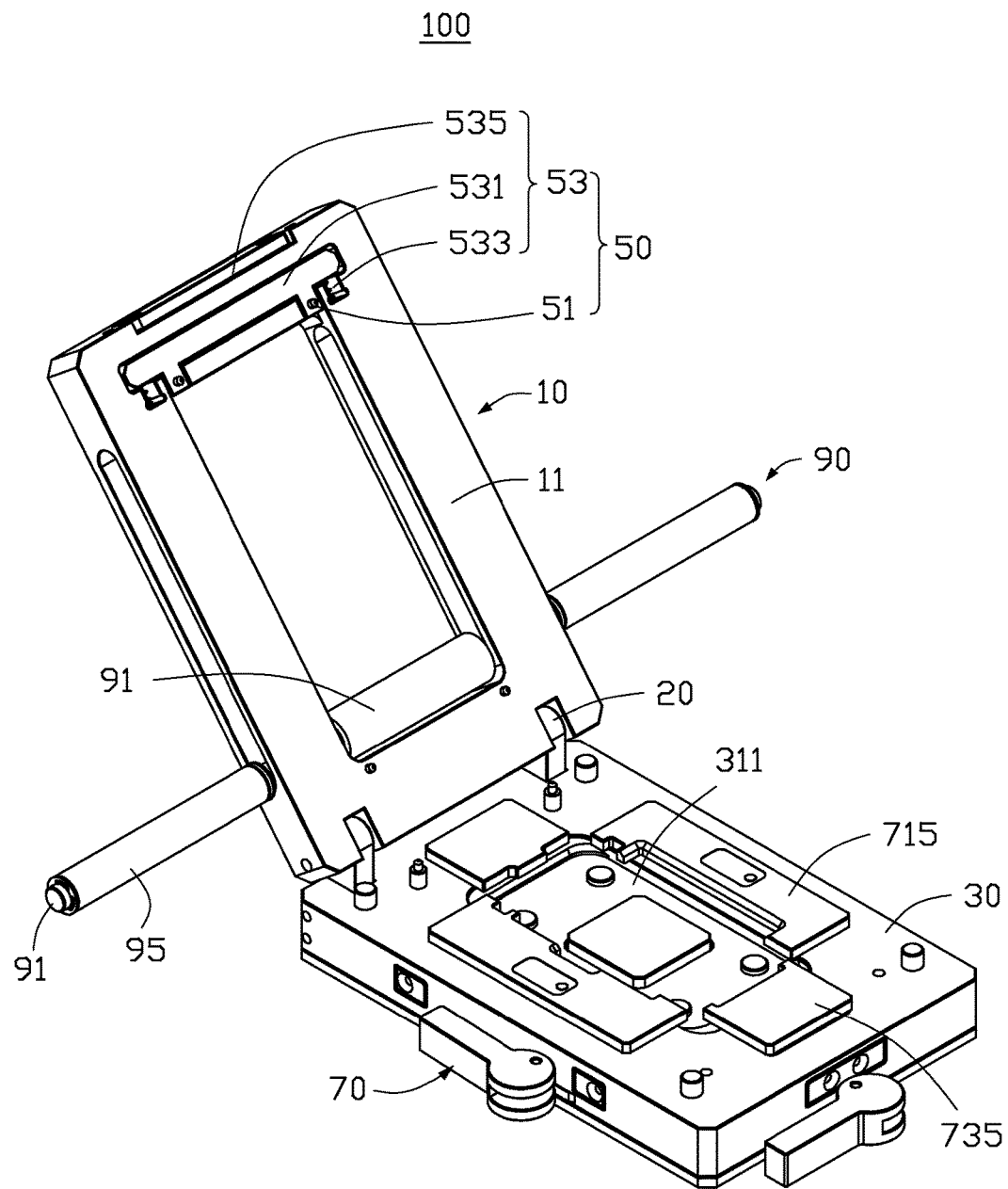
FIG. 1 illustrates an isometric view of a film application apparatus according to the present embodiment.

In view of the background, it is necessary to provide a high quality film application apparatus. The present disclosure through a pressing member can move relative a first base which can press the film material against the surface of the work piece, and improve the quality of the posted film on the display.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

FIG. 1 illustrates an embodiment of a film application apparatus 100 which is configured to post a film material (not shown) on a surface of a work piece (not shown). The work piece of the embodiment is a mobile phone (not shown).

The film application apparatus 100 is folding type. The film application apparatus 100 includes a first base 10, a pivot component 20 pin jointed with the first base 10. The pivot component 20 is coupled to a second base 30 and is rotatably coupled to the first base 10. A first locating component 50 is installed in the first base 10. A second locating component 70 is installed in the second base 30. A pressing component 90 is inserted through the first base 10.

Figure 2:
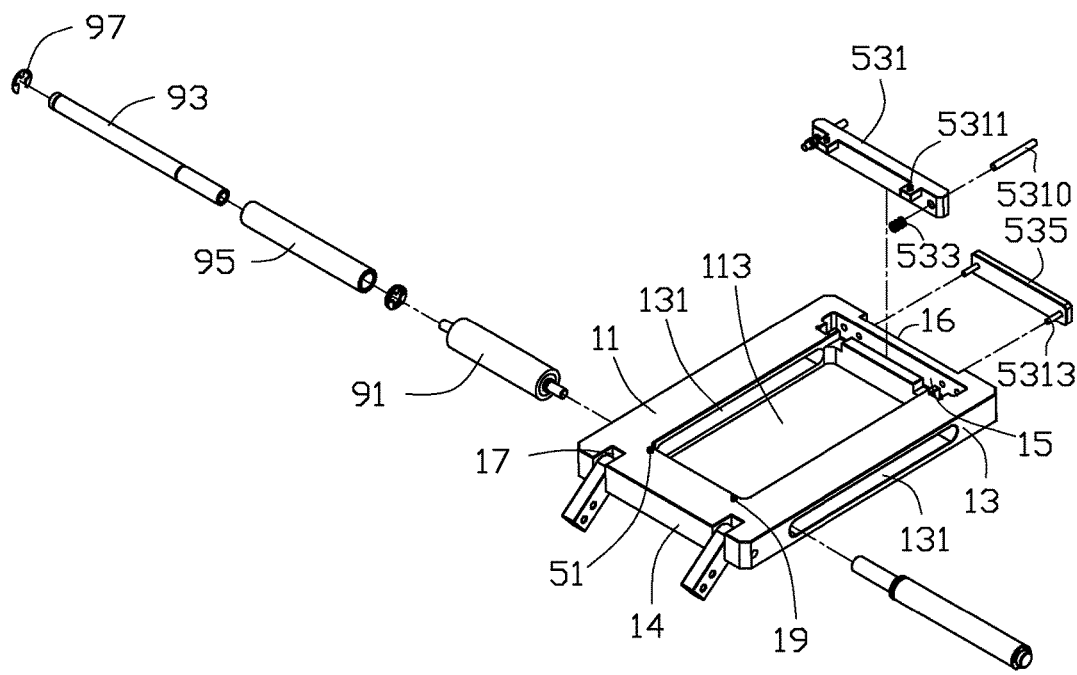
FIG. 2 illustrates an exploded, isometric view of a first base of the film application machine shown in FIG. 1.

FIG. 2 illustrate the first base 10 is roughly a cuboid and includes an installation face 11, two opposite first lateral faces 13 and two opposite second lateral faces 14. The first lateral faces 13 are parallel to the longitudinal axis of two sides of the first base 10. The second lateral faces 14 are parallel to the horizontal axis of two sides of the first base 10. The installation face 11 penetrates through the first base 10 defining an opening 113. The first lateral face 13 has a through hole 131 which is connected with the opening 113. One end of the installation face 11 in a direction perpendicularly to the installation face 11 defines a first installation groove 15. The second lateral face 14 is adjacent to and faces the first installation groove 15 and defines a second installation groove 16. Another end of the installation face 11 has two first pivot holes 17 which are provided on the second lateral face 14. The first installation groove 15 and the second installation groove 16 are configured to install the first locating component 50. The two corners of the opening 113 have two mounting holes 19. The mounting holes 19 are adjacent to the first pivot holes 17. The pivot component 20 is received by the first pivot holes 17 and is rotatably coupled to the first base 10 and the second base 30.

The first locating component 50 includes two mounting components 51 and a stock extending component 53. One of the mounting components 51 is corresponding to the mounting holes 19 of the first base 10. The mounting components 51 are detachably received by the mounting holes 19 so that the mounting components 51 are detachably coupled to the first base 10. The mounting components 51 are configured to fit the film material (not shown) of the first base 10.

The stock extending component 53 includes a supporting member 531, a first elastic member 533 received by the first installation groove 15, and a pressing member 535 received by the second installation groove 16. The supporting member 531 is coupled to the first base 10 through a position limiting member 5310. The supporting member 531 includes two position limiting holes 5311 near the opening 113. The two position limiting holes 5311 are configured to receive another mounting component 51 so that the mounting components 51 are detachably coupled to the supporting member 531. The position limiting member 5310 is installed into the first elastic member 533. One end of the first elastic member 533 is abutted against the sidewall of the first installation groove 15, and another end of the first elastic member 533 is abutted against the supporting member 531. In at least one embodiment, the first elastic member 533 is a compression spring positioned on the end of the supporting member 531. The pressing member 535 is a rectangular shape and is coupled to the first base 10 through a connecting member 5313. The connecting member 5313 is abutted against the supporting member 531.

When an external force is exerted on the pressing member 535, the pressing member 535 can press the supporting member 531 as well as the first elastic member 533. The supporting member 531 is moved in the direction toward the pivot component 20. When the external force disappears, the first elastic member 533 is recovered. The supporting member 531 moves back to the original position, and the mounting components 51 of the supporting member 531 also move accordingly. Therefore, the mounting components 51 give the film material (not shown) tension. Because of the tension, bubbles are not generated when attaching the film material. In at least one embodiment, the position limiting member 5310 is a pin.

Figure 3:
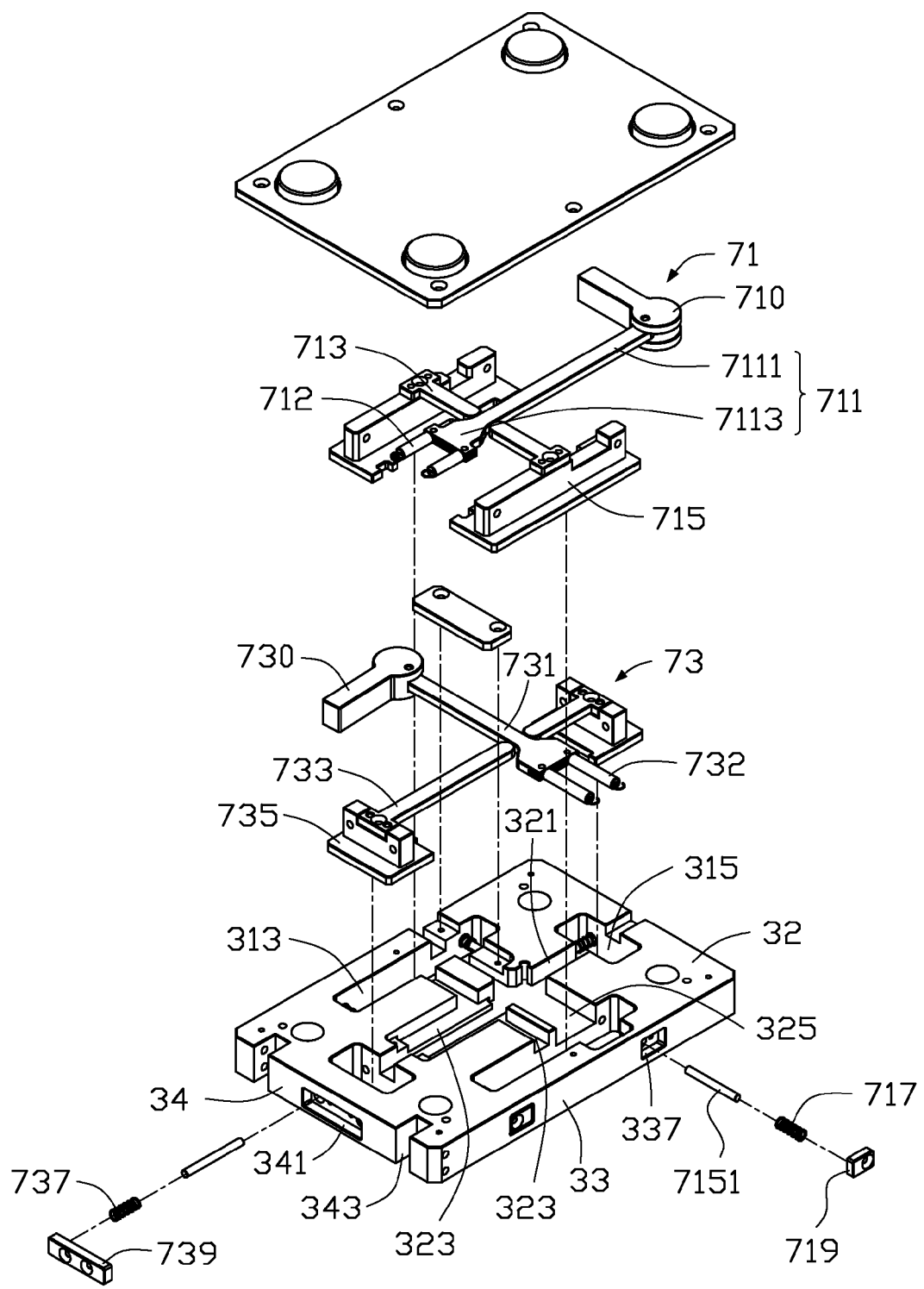
FIG. 3 illustrates an exploded, isometric view of a second base bottom of the film application machine shown in FIG. 1.

FIG. 3 illustrates the second base 30 which is substantially a rectangular prism. The second base 30 is configured to rotate relatively opposite to the first base 10. The second base 30 includes a first face 31 (shown in FIG. 4) and a parallel second face 32, and two third lateral faces 33 and two fourth lateral faces 34 that are coupled to the first face 31 and the second face 32 respectively. The two third laterals faces 33 are oppositely parallel to the longitudinal axis of two sides of the second base 30. The two fourth lateral faces 34 are oppositely parallel to the horizontal axis of two sides of the second base 30. When the first base 10 rotates and is close to the second base 30, the installation face 11 of the first base 10 is also close to the first face 31 of the second base 30.

Figure 4:
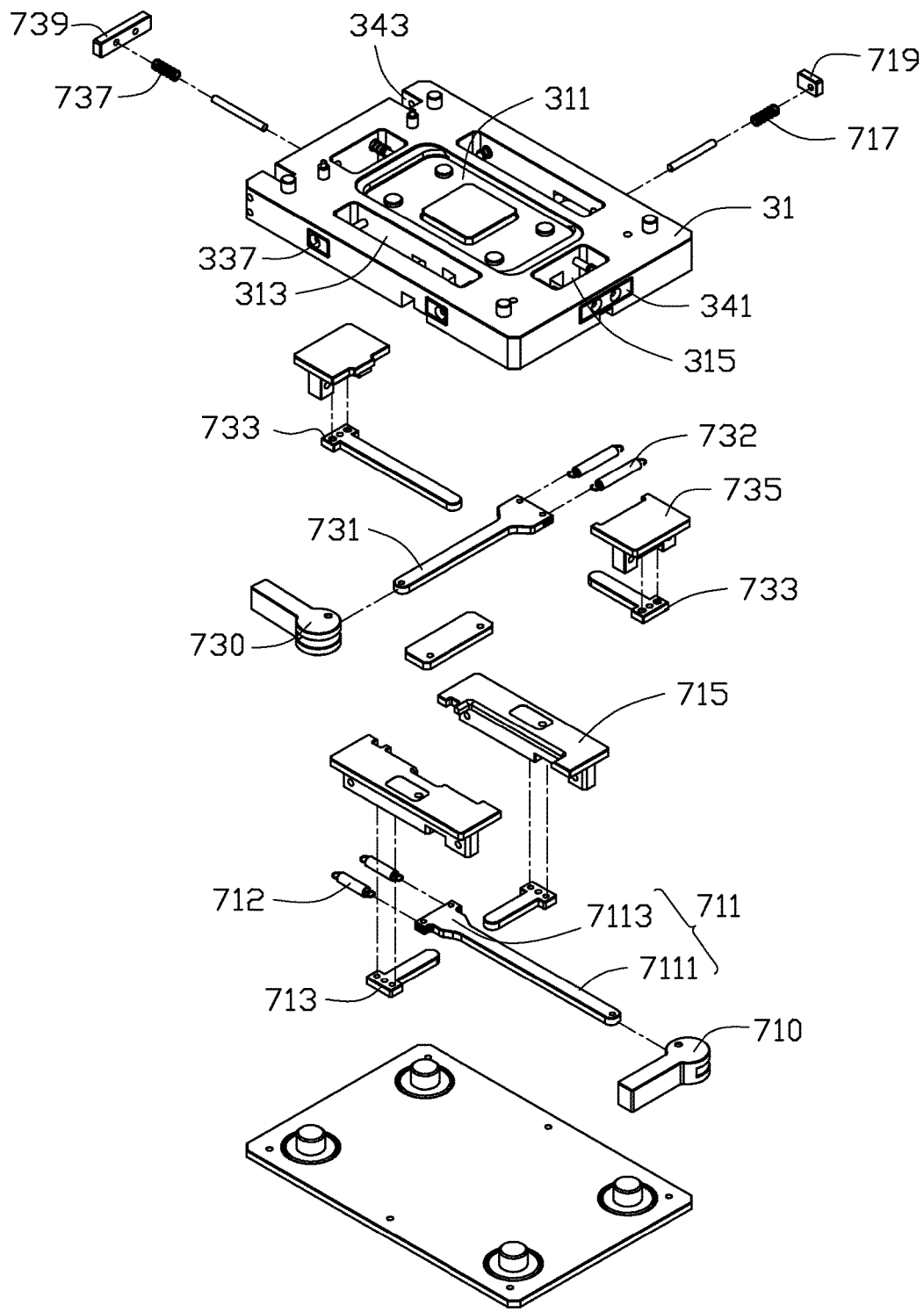
FIG. 4 illustrates an exploded, isometric view of the second base front shown in FIG. 3.

FIG. 4 illustrates the second base 30 front. The central place of the first face 31 towards the second face 32 defines a vertical hollow receiving chamber 311 for accommodating a work piece (not shown). Two first locating pits 313 and two second locating pits 315 are provided surrounding the receiving chamber 311 of the first face 31. The two first locating pits 313 are in parallel to the longitudinal axis of two sides of the second base 30 and penetrate through the second base 30 from the first face 31 to the second face 32 respectively. Two of the second locating pits 315 are in parallel to the horizontal axis of two sides of the second base 30 and penetrate through the second base 30 from the first face 31 to the second face 32 respectively. Two first fixed components 337 are provided on the third lateral face 33. Two second fixed components 341 are provided on the fourth lateral faces 34. One of the fourth lateral faces 34 has two second pivot holes 343 which are coupled to the first pivot holes 17 respectively. The pivot components 20 are received by the first pivot holes 17 and the second pivot holes 343 and are coupled to the first base 10 and the second base 30.

Referring to FIG. 3, a first container 321 is defined in the second face 32 at an end towards the first face 31. The first container 321 is substantially a long strip and is positioned along the longitudinal axis of the second base 30. One end of the first container 321 has fourth lateral faces 34. Another end of the first container 321 is coupled to the second locating pit 315.

The second face 32 towards the first face 31 defines two second containers 323. The two of the second containers 323 are positioned on two sides of the first container 321 respectively. The second container 323 is substantially an "L" shape. One end of the second container 323 is coupled to the first locating pits 313, and another side is coupled to the first container 321. The depth of the second container 323 is less than the depth of the first container 321.

The second face 32 includes a third container 325 along the horizontal central axis. One end of the third container 325 extends to one of the first locating pits 313 of the third lateral faces 33. Another end of the third container 325 is coupled to the third lateral face 33 of the second base 30. The width of the end of the third container 325 near the first locating pits 313 is larger than the other end of the third container 325.

The second locating component 70 includes a first adjusting component 71 and a second adjusting component 73 which are adjustably installed in the second base 30. In this embodiment, the first adjusting component 71 is configured to calibrate the position of the work piece (not shown) corresponding to a direction along the horizontal axis. The second adjusting component 73 is configured to calibrate the position of the work piece (not shown) corresponding to a direction along the longitudinal axis.

Figure 5:
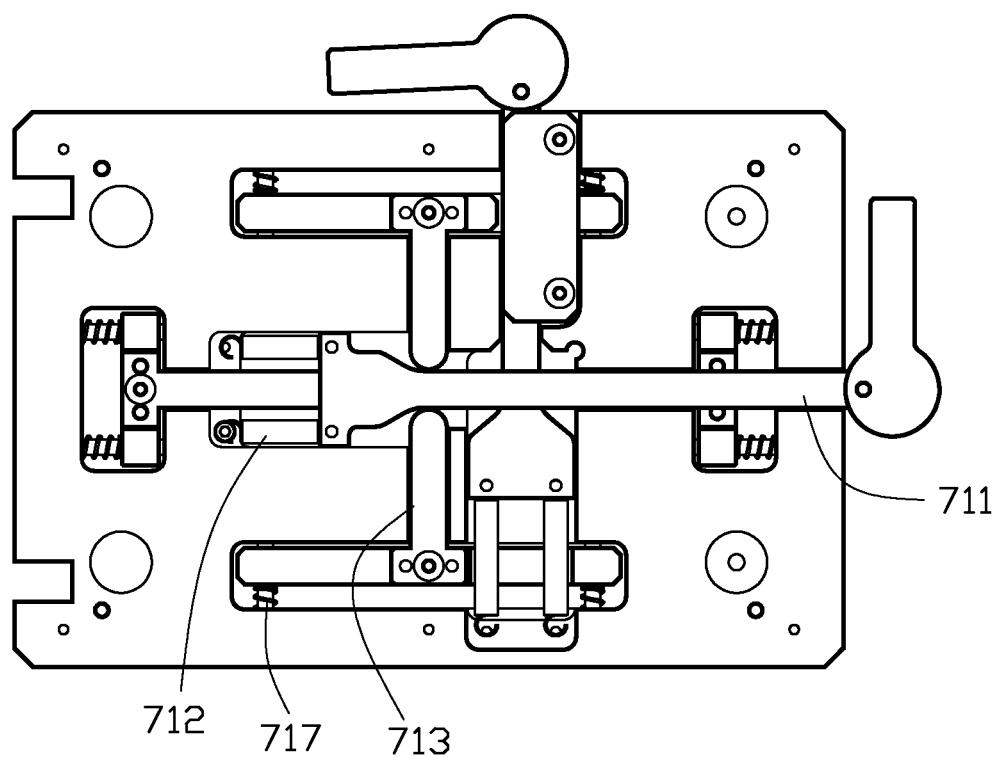
FIG. 5 illustrates a diagrammatic view of the second base of the film application machine shown in FIG. 3

FIG. 5 illustrates a diagrammatic view of the second base 30 shown in FIG. 3. The first adjusting component 71 includes a first operation shaft 710 and a first driving lever 711 installed in the second base 30, at least one first tension spring 712 coupled to the first driving lever 711, two first clamping rods 713 abut against two sides of the first driving lever 711, two first clamping members 715 fixedly coupled to the two first clamping rods 713, a second elastic member 717 abuts against the first clamping member 715, and a first fixing member 719 is received by the first fixed components 337.

Referring to FIG. 3, the first driving lever 711 is substantially a long strip. The first driving lever 711 includes a lever 7111 and a handle 7113. The lever 7111 is substantially a long strip and received by the first container 321 and the second container 323. One end of the lever 7111 is coupled to the handle 7113. Another end of the lever 7111 protrudes from the first container 321. The end of the first driving lever 711 jutted out from the second base 30 is coupled to the first operation shaft 710 so that the first driving lever 711 can move along the longitudinal axis of the second base 30 when the first operation shaft 710 is operated. The cross sectional area of the handle 7113 away from the lever 7111 increases. The cross sectional area of the lever 7111 away from the handle 7113 decreases. The handle 7113 is placed inside the second container 323. The handle 7113 is configured to move in parallel along the lever 7111. Accordingly, the first clamping rods 713 are configured to move along the handle 7113.

The first operation shaft 710 is rotatably coupled to the first driving lever 711. The first operation shaft 710 is provided on one end of the lever 7111 away from the handle 7113. The first operation shaft 710 is an eccentric cam structure. When the first operation shaft 710 rotates, the first driving lever 711 is shifted in the second base 30.

The first tension spring 712 is received by the second container 323. One end of the first tension spring 712 is fixed on the second base 30. Another end of the first tension spring 712 is coupled to the handle 7113 of the first driving lever 711. In this embodiment the number of the first tension springs 712 is two. When the external force working on the first driving lever 711 disappears, the first tension spring 712 pulls the first driving lever 711 back to its original position.

The two first clamping rods 713 are substantially "T" shape. Each of the first clamping rods 713 is received by the corresponding second container 323, and the partial portion of the first clamping rods 713 is received by the corresponding first locating pit 313. The two first clamping rods 713 are abutted against the two ends of the first driving lever 711 adjacent to the handle 7113 of the first driving lever 711. When the first driving lever 711 moves in the second base 30, the handle 7113 of the first driving lever 711 pushes the two first clamping rods 713 forward so that two first clamping rods 713 are moved closer or away.

The two first clamping members 715 are substantially rectangular prisms respectively received by the first locating pits 313. Partial portion of the first clamping member 715 bulges from the first face 31. The one end of the first clamping member 715 is fastened on the corresponding one end of the first clamping rods 713. When the two first clamping rods 713 are moved closer or away from, the two first clamping members 715 are also moved closer or away from. Therefore, the two first clamping members 715 can position the work piece (not shown) and add tension while clamping.

The first fixing member 719 is a substantially rectangular prism received by the first fixed components 337. One end of the second elastic member 717 is abutted against one end of the first clamping members 715, and another end of the second elastic member 717 is abutted against the first fixing member 719. The second elastic member 717 is installed in a pin 7151 of the first clamping members 715. The pin 7151 is coupled to the first clamping member 715 and the first fixing member 719. When the two of the first clamping members 715 move away from each other, the first clamping members 715 respectively press the second elastic member 717. When the work piece (not shown) is not clamped, the second elastic member 717 is configured to restore the first clamping members 715 back to original position. In this embodiment, the second elastic member 717 is coupled to the first fixing member 719.

The second adjusting component 73 structure is roughly the same as the first adjusting component 71, and includes a second operation handle 730, a second driving lever 731 coupled to the second operation handle 730, at least one second tension spring 732 coupled to the second driving lever 731, two second clamping rods 733 clamp two sides of the second driving lever 731, two second clamping members 735 clamp respectively related to the two second clamping rods 733. A third elastic member 737 props the second clamping member 735 and a second fixing member 739 is received in the second fixed component 341. The second driving lever 731 of the second adjusting component 73 is received in the third container 325 and stacked with the first driving lever 711 of the first adjusting component 71. One end of the second driving lever 731 protrudes from one of the third lateral faces 33 of the second base 30 which is coupled to the second operation handle 730, such that the second driving lever 731 could be shifted along the horizontal axis of the second base 30 as the second operation handle 730 operates. The second tension spring 732 is received in the third container 325, one end of the second tension spring 732 is fixed on the second base 30, and the other end is coupled to the second driving lever 731 of the second adjusting component 73. The two second clamping rods 733 of the second adjusting component 73 is correspondingly received in the first container 321 and clasps two sides of the second driving lever 731, and stack up with the first driving lever 711 of the first adjusting component 71. Two of the second clamping members 735 are blocks and received into the second locating pits 315 respectively, and a portion of the second clamping members 735 bulge from the first face 31. One end of the second clamping members 735 respectively corresponds to the fastened end of the second clamping rods 733. The second fixing member 739 is a block, received in and fastened to the second fixed component 341.

Referring to FIG. 2, the pressing component 90 includes a press 91 received by the opening 113, two rotating shafts 93 coupled to two ends of the press 91, two handles 95 installed in the two rotating shafts 93, and two clasps 97 provided on the two ends of the handles 95. Two ends of the press 91 are received by the two through holes 131 of the first base 10. The press 91 is configured to be shifted in a direction along the longitudinal axis of the first base 10. The press 91 is abutted against the film material (not shown). The two rotating shafts 93 are fixedly provided on the two ends of the press 91. The two rotating shafts 93 are passing through the through holes 131 of the first base 10 respectively. The press 91 is configured to press the film material (not shown) through the rotation of the two rotating shafts 93. Therefore, the film material is tightly attached on the work piece (not shown). The two clasps 97 are fixed on the rotating shafts 93. The clasps 97 are configured to fix the handles 95 on the rotating shafts 93 to prevent the handles 95 from being shifted in a direction along the axis of rotating shafts 93.

When in assembling, the first adjusting component 71 and the second adjusting component 73 are installed in the corresponding containers of the second base 30. The press 91 of the pressing component 90 is received by the opening 113 of the first base 10. The rotating shafts 93 pass through the through the hole 131 and are coupled to the ends of the press 91. The clasps 97 are coupled to the rotating shafts 93. The handles 95 are provided on the rotating shafts 93 and are coupled to the clasps 97. The first base 10 and the second base 30 are rotatably coupled through the pivot component 20. The installation face 11 of the first base 10 is configured to be attached to the first face 31 of the second base 30.

For use, the one side of the film material (not shown) is fixedly provided on the installation face 11 of the first base 10 through the mounting components 51 of the first locating component 50. The pressing member 535 is pressed so that the supporting member 531 and the mounting components 51 are forced to move in a direction toward the pivot component 20. The other side of the film material (not shown) is fixed on the supporting member 531 through the mounting components 51. When the external force generated by the pressing member 535 disappears, the supporting member 531 and the mounting components 51 move in a direction away from the pivot component 20. Therefore, the film material (not shown) is tensioned. Then the work piece (not shown) is put in the chamber 311 of the second base 30. The first base 10 and the second base 30 are together. The installation face 11 of the first base 10 is attached on the first face 31 of the second base 30. The position of the work piece (not shown) is calibrated and adjusted in the second base 30 through the first adjusting component 71 and the second adjusting component 73 of the second locating component 70. Finally, the handles 95 of the pressing component 90 are pushed so that the press 91 of the pressing component 90 moves. Therefore, the press 91 presses the film material to be attached on the work piece tightly.

In some embodiments, the pressing member 535 of the first locating component 50 can be removed. The film material (not shown) is tensioned by manually pushing the supporting member 531.

The film application apparatus 100 of the present disclosure is configured to control the tension of the film material (not shown) through the pressing component 90 and the first base 10. When the film material (not shown) is attached, the press 91 is configured to press the film material with the first locating component 50 calibrating the position of the film material. Therefore, the quality of the film material attachment is improved without bubbles or position errors.

Furthermore, the first adjusting component 71 and the second adjusting component 73 of the second locating component 70 are adjustable to fit the size of the work piece so that the second locating component 70 is flexible for the film application apparatus 100.

The embodiments shown and described above are only examples. Many details are often found in the art such as the other features of a film application apparatus. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A film application apparatus comprising:
a first base configured to fit a film material, the first base comprising an opening and two first lateral faces, each of the first lateral faces defining a through hole connected with the opening;
a second base rotatably coupled to the first base, the second base comprising a receiving chamber positioned on the second base for accommodating a work piece;
a pressing component extending through the opening from the two through holes, the pressing component configured to press the film material against a face of the work piece;
a first locating component installed in the first base; and
a second locating component installed in the second base, the second locating component comprising a first adjusting component and a second adjusting component inserting into the second base;
wherein the first adjusting component comprises a first driving lever installed in the second base and having two sides, at least one first tension spring coupled to the first driving lever, two first clamping rods abutted against the two sides of the first driving lever respectively, and two first clamping members fixedly coupled to the two first clamping rods, respectively.

2. The film application apparatus according to claim 1, wherein the pressing component comprises a press defined inside the opening, two rotating shafts respectively coupling to two ends of the press via the two through holes, and two handles respectively installed on the two rotating shafts.

3. The film application apparatus according to claim 1, wherein the first locating component comprises two mounting components and a stock extending component, the mounting components are configured to fit the film material on the first base.

4. The film application apparatus according to claim 3, wherein the stock extending component comprises a supporting member and a first elastic member, the supporting member is coupled to the first base, and the first elastic member abuts against the supporting member.

5. The film application apparatus according to claim 4, wherein the mounting components are detachably coupled to the first base and the supporting member.

6. The film application apparatus according to claim 4, wherein the first driving lever comprises a lever and a handle coupled to one end of the lever.

7. The film application apparatus according to claim 6, wherein a cross section of the lever is decreased in a direction away the handle whereby the handle is configured to move along the lever so as to drive the two first clamping rods closed to or distant from each other.

8. The film application apparatus according to claim 7, wherein the first adjusting component comprises a first operating shaft rotatably coupled to the first driving lever, the first operating shaft and the handle are defined on two opposite ends of the first driving lever, such that the first driving lever is configured to be shifted along the second base as the first operating shaft moves.

9. The film application apparatus according to claim 8, wherein the second base comprises a first face, a second face, two third lateral faces respectively coupled to the first and second face, and two fourth lateral faces respectively coupled to the first and second face, the receiving chamber is defined on the first face and surrounded by two first locating pits and two second locating pits, the first locating pits and the second locating pits penetrate through the second base from the first face to the second face.

10. The film application apparatus according to claim 9, wherein the second face comprises a first container, a second container communicated with the first container, and a third container communicated with the first container; the first driving lever is received into the first container, the at least one first tension spring is received into the second container, and the two first clamping rods are received into the third container.

11. The film application apparatus according to claim 9, wherein the second adjusting component comprises a second driving lever having two sides; the second locating component further comprises at least one second tension spring coupled to the second driving lever, two second clamping rods clasping the two sides of the second driving lever respectively, and two second clamping members fastening related to the two second clamping rods.

12. The film application apparatus according to claim 11, wherein the two second clamping members are respectively received into the two second locating pits and fastened by two second fixed components.

13. The film application apparatus according to claim 12, wherein each of the second fixed components comprises a pin, a third elastic member having two ends, and a second fixing member, the two ends of the third elastic member are respectively abutted against the related second clamping member and the second fixing member, the pin is installed in the third elastic member and coupled to the related second clamping member and the related second fixing member.

14. The film application apparatus according to claim 9, wherein the two first clamping members are respectively received into the two first locating pits and fastened by two first fixed components.

15. The film application apparatus according to claim 14, wherein each of the first fixed components comprises a pin, a second elastic member having two ends, and a first fixing member, the two ends of the second elastic member are respectively abutted against one of the first clamping members and the first fixing member, the pin is installed in the second elastic member and coupled to said one of the first clamping members and the first fixing member.

16. The film application apparatus according to claim 9, wherein the first base comprises an installation face, two opposite first lateral faces, and two opposite second lateral faces coupling to the installation face, the opening is defined on the installation face and penetrates through the first base, the two through holes respectively penetrate through the two first lateral faces to the opening, a first installation groove is perpendicularly defined on the installation face, the supporting member and the first elastic member are received into the first installation groove, one end of the first elastic member is propped against a sidewall of the first installation groove and the other end of the first elastic member is propped against the supporting member.

17. The film application apparatus according to claim 16, wherein the film application apparatus further comprises two pivot components located on the first face of the second base, two first pivot holes provided on one of the two opposite second lateral faces of the first base, and two second pivot holes provided on one of the fourth lateral faces of the second base, the two first pivot holes are respectively corresponding to the two second pivot holes, the two pivot components are received into the related two first pivot holes and the two second pivot holes, whereby the first base is rotatably couple to the second base.

\* \* \* \* \*

UNITED STATES PATENT AND TRADEMARK OFFICE
CERTIFICATE OF CORRECTION

PATENT NO. : 10,118,333 B2  
APPLICATION NO. : 14/838697  
DATED : November 6, 2018  
INVENTOR(S) : Xin-Jian Zhang et al.

Page 1 of 1

It is certified that error appears in the above-identified patent and that said Letters Patent is hereby corrected as shown below:

On the Title Page

Item (73) regarding "Assignees" should read:  
(73) Assignees: SHENZHENSHI YUZHAN PRECISION TECHNOLOGY CO., LTD., Shenzhen (CN); CLOUD NETWORK TECHNOLOGY SINGAPORE PTE. LTD., Singapore (SG)

Signed and Sealed this  
Fifteenth Day of September, 2020

Andrei Iancu  
*Director of the United States Patent and Trademark Office*